(12) United States Patent
Takechi et al.

(10) Patent No.: US 12,441,091 B2
(45) Date of Patent: *Oct. 14, 2025

(54) FRICTION TRANSMISSION BELT AND MANUFACTURING METHOD THEREOF

(71) Applicant: Mitsuboshi Belting Ltd., Kobe (JP)

(72) Inventors: Hiroki Takechi, Hyogo (JP); Kouhei Hamamoto, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 1031 days.

This patent is subject to a terminal disclaimer.

(21) Appl. No.: 16/961,156

(22) PCT Filed: Dec. 27, 2018

(86) PCT No.: PCT/JP2018/048133
§ 371 (c)(1),
(2) Date: Jul. 9, 2020

(87) PCT Pub. No.: WO2019/138906
PCT Pub. Date: Jul. 18, 2019

(65) Prior Publication Data
US 2020/0362941 A1  Nov. 19, 2020

(30) Foreign Application Priority Data

Jan. 10, 2018 (JP) .................................. 2018-002080
Dec. 17, 2018 (JP) .................................. 2018-235506

(51) Int. Cl.
*B32B 25/10* (2006.01)
*B29D 29/10* (2006.01)
(Continued)

(52) U.S. Cl.
CPC ............ *B32B 25/10* (2013.01); *B29D 29/103* (2013.01); *B32B 3/30* (2013.01); *F16G 5/08* (2013.01);
(Continued)

(58) Field of Classification Search
CPC ..... B32B 25/10; B32B 3/30; B32B 2260/021; B32B 2260/046; B32B 2262/062;
(Continued)

(56) References Cited

U.S. PATENT DOCUMENTS 11,796,034 B2 * 10/2023 Hamamoto ............... F16G 5/06
474/260
2016/0053851 A1 2/2016 Kojima et al.
(Continued)

FOREIGN PATENT DOCUMENTS

CN 106084362 A * 11/2016
EP 3199832 A1 8/2017
(Continued)

OTHER PUBLICATIONS

Machine translation of JP 2015-143573 A (Year: 2015).*
(Continued)

*Primary Examiner* — Callie E Shosho
*Assistant Examiner* — Steven A Rice
(74) *Attorney, Agent, or Firm* — Banner & Witcoff, Ltd.

(57) ABSTRACT

A frictional power-transmission belt having a frictional power-transmission surface covered with a composite fiber layer, in which the composite fiber layer includes a fiber member and an isocyanate compound, and the fiber member includes a cellulose-based fiber. In the frictional power-transmission belt, the isocyanate compound may have a proportion of 3 to 20 mass % in the composite fiber layer.

12 Claims, 3 Drawing Sheets

(51) Int. Cl.
*B32B 3/30* (2006.01)
*F16G 5/08* (2006.01)

(52) U.S. Cl.
CPC ... *B32B 2260/021* (2013.01); *B32B 2260/046* (2013.01); *B32B 2262/062* (2013.01); *B32B 2433/04* (2013.01)

(58) Field of Classification Search
CPC ..... B32B 2433/04; B32B 5/28; B29D 29/103; F16G 5/08; F16G 5/20; D03D 1/00; D04B 1/00; D04B 21/00
USPC ...................................................... 428/423.1
See application file for complete search history.

(56) References Cited

U.S. PATENT DOCUMENTS

2017/0016176 A1* 1/2017 Shimada ............... D06M 15/55
2017/0284504 A1 10/2017 Mitsutomi et al.

FOREIGN PATENT DOCUMENTS

| JP | 2006-007534 A | 1/2006 |
| JP | 2009287133 A * | 12/2009 |
| JP | 2013-018918 A | 1/2013 |
| JP | 2014-209028 A | 11/2014 |
| JP | 2015-143573 A | 8/2015 |
| JP | 2016-070494 A | 5/2016 |
| JP | 2016-188353 A | 11/2016 |
| JP | 2017-137993 A | 8/2017 |
| JP | 2017-137994 A | 8/2017 |
| WO | 2009/110150 A1 | 9/2009 |

OTHER PUBLICATIONS

Machine translation of CN 106084362 A (Year: 2016).*
Machine translation of JP 2009-287133 A (Year: 2009).*
Sep. 7, 2021—(EP) Extended Search Report—App 18900082.1.
Nov. 3, 2021—(CN) Notification of the Second Office—App 201880085671.9.
Apr. 21, 2021—(CN) Notification of the First Office Action—App 201880085671.9.
Sep. 4, 2019—(WO) Written Opinion and Search Report—App PCT/JP2018/048133.
Nov. 19, 2019—(JP) Notification of Reasons for Refusal—App 2018-235506.
Sep. 26, 2019—(TW) Office Action—App 108100835.
May 3, 2023—(EP) Office Action—App 18900082.1.
Mar. 8, 2022—(CN) Notification of the Third Office Action—App 201880085671.9.

* cited by examiner

FRICTION TRANSMISSION BELT AND MANUFACTURING METHOD THEREOF

CROSS REFERENCE TO RELATED APPLICATIONS

This is a U.S. National Phase Application under 35 U.S.C. § 371 of International Application No. PCT/JP2018/048133, filed Dec. 27, 2018, which claims priority to Japanese Application Nos. 2018-002080, filed Jan. 10, 2018, and 2018-235506, filed Dec. 17, 2018, which was published Under PCT Article 21(2), the entire contents of which are incorporated herein by reference.

TECHNICAL FIELD

The present invention relates to a frictional power-transmission belt (such as a V-ribbed belt) having a frictional power-transmission surface covered with a fabric (such as a knitted fabric) and having high power-transmission efficiency and improved calmness (or quietness or resistance to sound generation), and relates to a manufacturing method thereof.

BACKGROUND ART

Frictional power-transmission belts are used broadly for driving accessories of automobiles or for driving agricultural machines. Examples of the frictional power-transmission belts may include flat belts, V-belts, and V-ribbed belts. Such a frictional power-transmission belt is used in distinction from a meshing power-transmission belt such as a toothed belt which transmits power through mechanical meshing between a pulley and a tooth portion of the belt. In some frictional power-transmission belts, a frictional power-transmission surface is covered with a fiber member in order to enhance wear resistance or adjust a friction coefficient. Woven fabric, knitted fabric, nonwoven fabric, etc. can be used as the fiber member Various fibers may be used as fibers forming the fiber member in accordance with requests such as wear resistance, water absorbability, etc.

For example, JP-A-2014-209028 (Patent Literature 1) discloses a V-ribbed belt in which a frictional power-transmission surface is covered with a knitted cloth formed of a bulk textured polyester-based composite yarn and a cellulose-based natural spun yarn, and the forming ratio of the cellulose-based natural spun yarn is equal to or higher than the forming ratio of the polyester-based composite yarn. The literature describes that when the forming ratios of the polyester-based composite yarn and the cellulose-based natural spun yarn are adjusted, both increase in friction coefficient of the frictional power-transmission surface in a dry state and decrease in friction coefficient of the frictional power-transmission surface in a wet state can be inhibited to sufficiently reduce a difference in friction coefficient between the dry state and the wet state.

The V-ribbed belt shows a certain effect to suppress occurrence of abnormal sound caused by so-called "stick slip" in which large slipping occurs intermittently between the belt and a pulley. However, the V-ribbed belt essentially uses the cellulose-based natural spun yarn which is low in wear resistance. When the belt is in use, there is a concern that the cellulose-based natural spun yarn may fall off from the frictional power-transmission surface so that abnormal sound may easily generate. Thus, it has been requested to improve the V-ribbed belt.

CITATION LIST

Patent Literature

Patent Literature 1: JP-A-2014-209028 (Claim 1, paragraph [0011])

SUMMARY OF INVENTION

Technical Problem

Therefore, an object of the present invention is to provide a frictional power-transmission belt high in resistance to sound generation with water and capable of sustaining the resistance to sound generation with water for a long time, and to provide a method for manufacturing the same.

Another object of the present invention is to provide a frictional power-transmission belt capable of being manufactured easily with small burden on environment and with high productivity, and a method for manufacturing the same.

Solution to Problem

As a result of earnest investigation to attain the foregoing objects, the present inventors found that when a frictional power-transmission surface (power transmission surface) in contact with a pulley is covered with a composite fiber layer including a fiber member including a cellulose-based fiber and an isocyanate compound, resistance to sound generation with water can be improved, and the resistance to sound generation with water can be sustained for a long time. Thus, the present invention was completed.

That is, a frictional power-transmission belt of the present invention is a frictional power-transmission belt having a frictional power-transmission surface covered with a composite fiber layer, in which the composite fiber layer includes a fiber member and an isocyanate compound, and the fiber member includes a cellulose-based fiber. The proportion of the isocyanate compound may be about 3 to 20 mass % in the composite fiber layer. The isocyanate compound may be a thermally-reactive isocyanate compound. The thermally-reactive isocyanate compound may have a dissociation temperature of 120° C. or higher. The cellulose-based fiber may be a spun yarn formed of a cellulose. The fiber member may further includes a synthetic fiber. The frictional power-transmission belt may be a V-ribbed belt.

The present invention also includes a manufacturing method of the frictional power-transmission belt, including a composite fiber layer forming step of forming a sheet for the composite fiber layer including the fiber member and the isocyanate compound, in the composite fiber layer forming step, the fiber member may be immersed in a liquid composition including the isocyanate compound so as to impregnate the fiber member with the isocyanate compound. The liquid composition may be an aqueous solution including the thermally-reactive isocyanate compound. In the composite fiber layer forming step, the fiber member impregnated with the liquid composition by an immersion may be dried at a temperature lower than the dissociation temperature of the thermally-reactive isocyanate compound. The proportion of the isocyanate compound in the liquid composition may be about 1 to 8 mass %.

Advantageous Effects of Invention

According to the present invention, the frictional power-transmission surface of the frictional power-transmission belt is covered with the composite fiber layer including the fiber member including the cellulose-based fiber, and the isocyanate compound. Thus, the resistance to sound generation with water is high, and the resistance to sound generation with water can be sustained for a long time. In addition, when the thermally-reactive isocyanate compound is used as the isocyanate compound, the thermally-reactive isocyanate compound does not impede elongation of a knitted fabric when the belt is shaped, and can be cured to improve the wear resistance after the belt is vulcanized. Thus, the productivity of the frictional power-transmission belt having excellent durability can be improved. Furthermore, when an immersion liquid including the isocyanate compound is prepared into a water-based one, the liquid preparation is easier and the burden on environment is also smaller than a case of a resorcin-formalin-latex liquid (RFL liquid) generally used as a canvas treating agent.

DESCRIPTION OF EMBODIMENTS

An example of an embodiment of the present invention will be described in detail below, if necessary, with reference to the accompanying drawings. A frictional power-transmission belt of the present invention is not particularly limited as long as it has a frictional power-transmission surface which can come into contact with a pulley, and may be a V-belt, a V-ribbed belt, a flat belt, or the like. In addition, the frictional power-transmission belt may be a belt in which frictional power-transmission portions (such as ribs) are formed. A V-ribbed belt in which a plurality of V-shaped rib portions extending in the circumferential length direction of the belt are formed to have a high transmission efficiency is a typical power-transmission belt. The present invention can be also applied particularly suitably to, among such frictional power-transmission belts, a V-ribbed belt strongly required to improve the resistance to sound generation with water, in terms of the highest effect for improving the resistance to sound generation with water.

Figure 1:
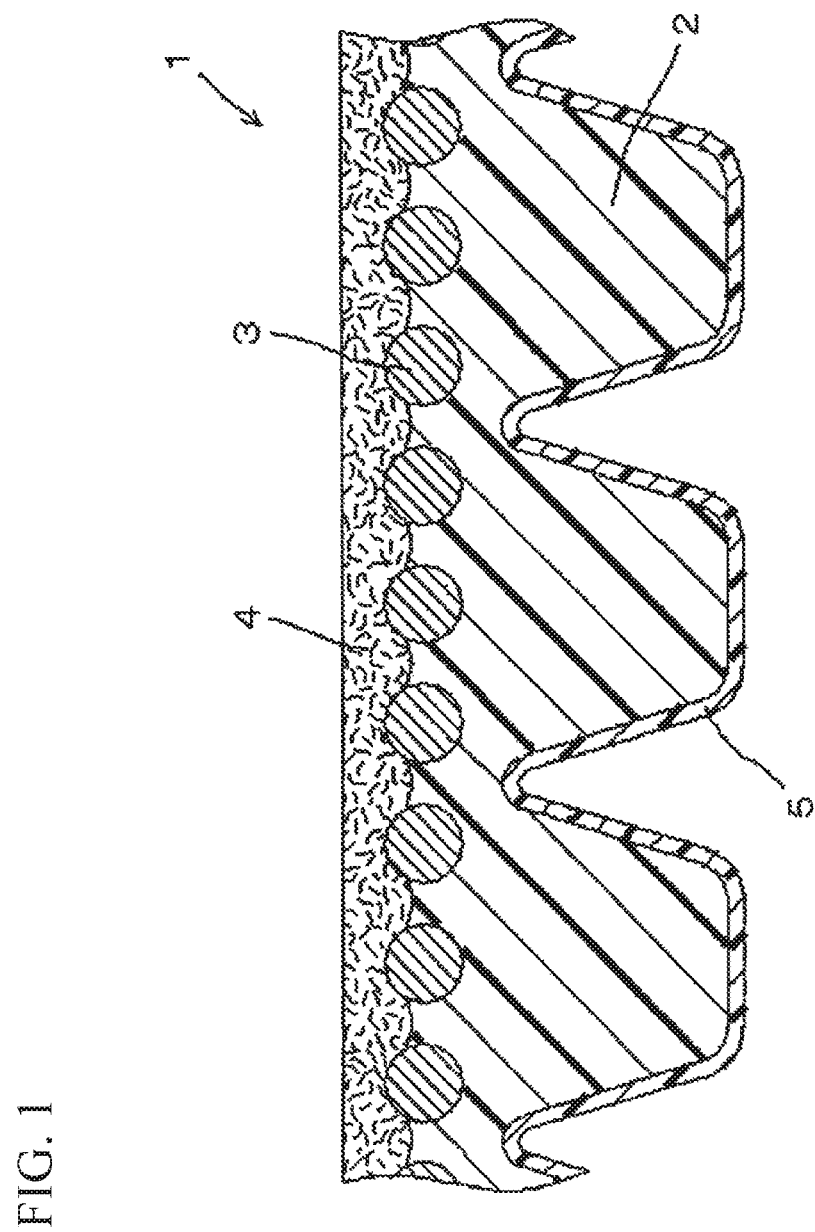
FIG. 1 is a schematic sectional view showing an example of a V-ribbed belt of the present invention.

As shown in FIG. 1, a frictional power-transmission belt (V-ribbed belt) 1 of the present invention includes a tension layer 4, a compression layer (compression rubber layer) 2, a composite fiber layer 5, and a core body 3. The tension layer 4 forms a belt back surface (outer circumferential surface of the belt) and is made of a cover canvas (such as woven fabric, knitted fabric or nonwoven fabric). The compression layer (compression rubber layer) 2 is formed on one side (one surface side) of the tension layer and has a frictional power-transmission surface (a surface of a frictional power-transmission portion). The composite fiber layer 5 covers (is laminated on) the frictional power-transmission surface of the compression layer (compression rubber layer) 2 to form an inner circumferential surface of the belt and can come into contact with a pulley. The core body 3 is buried between the tension layer 4 and the compression layer 2 in the longitudinal direction (circumferential length direction) of the belt. In this embodiment, the core body 3 is made of core wires (twisted cords) arrayed at predetermined intervals in the width direction of the belt. The core body 3 touches the tension layer 4 and the compression layer 2 so as to be placed between the two layers.

In the compression layer 2, a plurality of sectionally V-shaped grooves extending in the longitudinal direction of the belt are formed, and a plurality of ribs each having a sectionally V-shape (inverted trapezoid shape) are formed among the grooves so that the two slopes (surfaces) of each rib form frictional power-transmission surfaces. The frictional power-transmission surfaces can touch a pulley via the composite fiber layer 5. The composite fiber layer 5 includes a fiber member including a cellulose-based fiber, and an isocyanate compound.

The present invention is suitably applied to a power-transmission belt in which a surface for frictional power-transmission with a pulley (or a frictional power-transmission portion) is formed in the compression layer 2. The frictional power-transmission belt of the present invention is not limited to the aforementioned structure. The tension layer 4 may be, for example, formed of a rubber composition. An adhesion layer may be put between the compression layer 2 and the tension layer 4 in order to improve adhesion between the core body 3 and the tension layer 4 or the compression layer 2. The core body 3 is buried between the tension layer 4 and the compression layer 2. For example, the core body 3 may be buried in the compression layer 2, or may be buried in the compression layer 2 while being brought into contact with the tension layer 4. Further, the core body 3 may be buried in the aforementioned adhesion layer, or the core body 3 may be buried between the compression layer 2 and the adhesion layer or between the adhesion layer and the tension layer 4.

The respective members constituting the belt and a method for manufacturing the belt will be described in detail below

[Composite Fiber Layer]

The composite fiber layer contains a fiber member and an isocyanate compound.

(Fiber Member)

In the present invention, a fiber constituting the fiber member includes a cellulose-based fiber. Thus, the fiber member is superior in water absorbability in the frictional power-transmission surface, and a water film is hardly formed between a pulley and the belt. Accordingly, occurrence of stick slip is inhibited, and the resistance to sound generation with water is high.

(A) Cellulose-Based Fiber

The cellulose-based fiber includes a cellulose fiber (cellulose fiber derived from plants, animals, bacteria, etc.), and a fiber of cellulose derivatives.

Examples of the cellulose fiber include natural-plant-origin cellulose fiber (pulp fiber) such as wood pulp (coniferous tree pulp, broad-leaved tree pulp, etc.), bamboo fiber, sugar cane fiber, seed hair fiber (cotton fiber (cotton linter), kapok, etc.), bast fiber (hemp, paper mulberry, paper bush, etc.), or leaf fiber (Manila hemp, New Zealand hemp, etc.); animal-origin cellulose fiber such as ascidian cellulose; bacteria cellulose fiber; and algae cellulose.

Examples of the fiber of cellulose derivatives include cellulose ester fiber, and regenerated cellulose fiber (such as rayon, cupro or lyocell).

Each of those cellulose-based fibers may be used alone, or two or more kinds of them may be used in combination. Among them, cellulose fiber such as cotton fiber or hemp, or regenerated cellulose fiber such as rayon is preferred, and the cellulose fiber such as cotton fiber is particularly preferred in terms of water absorbability.

The cellulose-based fiber may be staple fiber, but in terms of strength it is preferably a continuous fiber or a spun yarn in which staple fibers are twisted. The continuous fiber may include a monofilament yarn or a multifilament yarn. The multifilament yarn may be an untwisted yarn or a twisted yarn. The twisted yarn may be a yarn (such as an organzine, a koma twist yarn, or a Lang's lay yarn) in which a plurality of single twisted yarns as primary-twisted yarns are secondary-twisted, or a twisted yarn (such as a corkscrew-twisted yarn) in which a single twisted yarn and a single yarn as primary-twisted yarns are secondary-twisted. Among them, the spun yarn or the multifilament yarn of the spun yarn is preferred for the case of the cellulose fiber. Particularly the spun yarn is preferred.

For the case of the spun yarn, the thickness (count) of the cellulose-based fiber (particularly the cellulose fiber) is, for example, about 5 to 100 count, preferably about 10 to 80 count, and more preferably about 20 to 70 count (particularly 30 to 50 count). When the thickness is too small, there is a concern that the mechanical characteristic of the composite fiber layer may be lowered. When the thickness is too large, there is a concern that the water absorbability may be lowered.

(B) Synthetic Fiber

The fiber member may further contain a synthetic fiber in addition to the cellulose-based fiber in order to inhibit the cellulose-based fiber from being worn, to thereby sustain the resistance to sound generation with water for a long time.

Examples of the synthetic fiber include a polyolefin fiber (a polyethylene fiber, a polypropylene fiber, etc.), a polyvinyl alcohol-based fiber (such as polyvinyl alcohol, a fiber of ethylene-vinyl alcohol copolymer, vinylon, etc.), a polyamide fiber (an aliphatic polyamide fiber such as a polyamide-6 fiber, a polyamide-66 fiber or a polyamide-46 fiber, an aromatic polyamide fiber such as an aramid fiber, etc.), an acrylic fiber, a polyester fiber [a $C_{2-4}$ alkylene $C_{6-14}$ arylate-based fiber such as a polyethylene terephthalate (PET) fiber, a polypropylene terephthalate (PPT) fiber, a polytriniethylene terephthalate (PTT) fiber, a polybutylene terephthalate (PBT) fiber or a polyethylene naphthalate (PEN) fiber, a polyarylate-based fiber, etc.], a poly-para-phenylene benzobisoxazole (PBO) fiber, and a polyurethane fiber. Each of those synthetic fibers may be used alone, or two or more kinds of them may be used in combination.

The synthetic fiber may be also a staple fiber, but in terms of strength it is preferably a monofilament yarn or a multifilament yarn which is a continuous fiber. Particularly the multifilament yarn is preferred. The multifilament yarn may be an untwisted yarn or a twisted yarn. The twisted yarn may be a yarn (such as an organzine, a koma twist yarn, or a Lang's lay yarn) in which a plurality of single twisted yarns as primary-twisted yarns are secondary-twisted, or a twisted yarn (such as a corkscrew-twisted yarn) in which a single twisted yarn and a single yarn as primary-twisted yarns are secondary-twisted.

The multifilament yarn (or the twisted yarn) may be a composite yarn (or a composite fiber) formed of a plurality of fibers (or yarns). The composite yarn (or the twisted yarn) may be a covering yarn [a yarn (twisted yarn) including a core yarn and a sheath yarn wound on (covering) the core yarn]. The composite yarn may be a composite yarn of the cellulose-based fiber and the synthetic fiber, but a composite fiber of synthetic fibers (a composite yarn of synthetic fibers) is generally used.

Examples of the composite yarn of the synthetic fibers may include a composite yarn in which a plurality of polyester fibers (for example, PET fibers and PTT fibers) are conjugated, and a covering yarn in which a core yarn and a sheath yarn are both formed of synthetic fibers [for example, a yarn in which one of a core yarn and a sheath yarn is formed of a stretchable fiber, for example, a covering yarn or a composite yarn in which a core yarn is formed of a stretchable fiber such as a polyurethane fiber (PU fiber) while a sheath yarn is formed of a polyester fiber (such as a PET fiber)].

In the present invention, in order to improve the wear resistance in the composite fiber layer and to inhibit rubber from seeping out to the frictional power-transmission surface (or the surface of the fiber member), a bulk textured yarn having an enlarged sectional bulk, such as a crimped conjugate yarn including a plurality of fibers (a composite yarn of crimped fibers), a covering yarn in which a core yarn is covered with the synthetic fiber, a crimped yarn (a crimped yarn of the synthetic fiber), a woolly finished yarn, a taslan finished yarn, or an interlaced yarn is preferable. Among them, the conjugate yarn or the covering yarn is particularly preferred. The conjugate yarn is a bulk textured yarn which has a sectional structure where a plurality of polymers are phase-separated and pasted on each other in the fiber axis direction, and crimping has been generated by heat treatment by use of a difference in thermal shrinkage ratio between the polymers. The covering yarn is a bulk textured yarn in which a surface of a core yarn is wrapped (covered) with another yarn winding around the core yarn so as to increase the sectional bulk of the yarn as a whole. Typical examples of the bulk textured yarn include a polyester based composite yarn such as a conjugate yarn such as a composite yarn (PTT/PET conjugate yarn) in which PTT and PET owe conjugated or a composite yarn (PBT/PET conjugate yarn) in which PBT and PET are conjugated; and a covering yarn such as a composite yarn (PET/PU covering yarn) in which a surface of a polyurethane (PU) yarn (PU elastic yarn) as a core yarn is covered with a polyester fiber (PET fiber) winding around the polyurethane yarn, or a composite yarn (PA/PU covering yarn) in which a PU yarn as a core yarn is covered with polyamide (PA). Among those composite yarns, the PTT/PET conjugate yarn and/or the PET/PU covering yarn are preferred because they are superior in stretchability and wear resistance.

Such a bulk textured yarn increases the bulk of the fiber member and includes a fiber having stretchability. Therefore, when the bulk textured yarn is used in the belt, the increased bulk can prevent rubber of the belt body from seeping out to the frictional power-transmission surface (or the surface of the fiber member), so that increase in friction coefficient in a dry state and decrease in friction coefficient in a wet state in the frictional power-transmission surface can be prevented. In addition, the frictional power-transmission surface has a high water absorbability owing to the cellulose-based fiber (or the spun yarn). Thus, the decrease in friction coefficient in the frictional power-transmission surface in the wet state can be prevented so that a difference in friction coefficient between the dry state and the wet state can be reduced sufficiently.

The fineness of the synthetic fiber (particularly the multifilament yarn) may be, for example, about 20 to 600 dtex, preferably about 50 to 300 dtex, and more preferably about 60 to 200 dtex (particularly 70 to 100 dtex).

The proportion of the synthetic fiber in the fiber member may be 250 parts by mass or lower (for example, 0 to 200 parts by mass) with respect to 100 parts by mass of the cellulose-based fiber. The proportion of the synthetic fiber is, for example, about 1 to 150 parts by mass (for example, 1 to 100 parts by mass), preferably about 3 to 80 parts by mass, and more preferably about 5 to 75 parts by mass (particularly 10 to 70 parts by mass) with respect to 100 parts by mass of the cellulose-based fiber. In addition, in order to sustain the resistance to sound generation with water for a long time, the proportion of the synthetic fiber is, for example, about 5 to 70 parts by mass (for example, 5 to 50 parts by mass), and preferably about 10 to 40 parts by mass (particularly 20 to 30 parts by mass) with respect to 100 parts by mass of the cellulose-based fiber. When the proportion of the synthetic fiber is too high, there is a concern that the water absorbability of the composite fiber layer is lowered to reduce the resistance to sound generation with water.

(C) Other Fibers

The fiber member may further include other fibers in addition to the cellulose-based fiber and the synthetic fiber. Examples of the other fibers include an animal-origin fiber such as wool or silk, and an inorganic fiber such as a carbon fiber, a glass fiber or a metal fiber. The proportion of the other fibers may be, for example, 100 parts by mass or lower (for example, 0 to 100 parts by mass) with respect to 100 parts by mass of the cellulose-based fiber. The proportion of the other fibers is, for example, about 0.1 to 30 parts by mass, preferably about 0.5 to 20 parts by mass, and more preferably about 1 to 10 parts by mass with respect to 100 parts by mass of the cellulose-based fiber. When the proportion of the other fibers is too high, there is a concern that the water absorbability of the composite fiber layer is lowered to reduce the resistance to sound generation with water.

(D) Structure of Fiber Member

The fiber member has a form (structure) capable of covering the frictional power-transmission surface of the power-transmission belt. Typically the fiber member can be formed of at least one kind of fabric (or canvas) selected from knitted fabric, woven fabric, nonwoven fabric, etc. Among those fabrics, the fiber member is preferably formed of the knitted fabric. The knitted fabric is superior in stretchability so that the knitted fabric can stretch following a flow of rubber when it is vulcanized. Thus, the rubber can be prevented from being exposed to the frictional power-transmission surface, so that the resistance to sound generation with water can be improved. Further, the knitted fabric is suitable for laying the fiber member along the outline (such as a rib shape) of the frictional power-transmission surface.

The knitted fabric is formed by looping yarns without crossing each other linearly. That is, the knitted fabric has a knitted texture (structure) arranged as follows. That is, one or more knitting yarns form a mesh (loop), and a next yarn is hooked in the loop to form a new loop successively. Owing to the structure, the knitted fabric has high stretchability, and can be laid easily along an irregular face such as a rib portion of the frictional power-transmission surface. Thus, the fiber member can be formed to cover and be jointed to the frictional power-transmission surface in accordance with vulcanization molding.

The knitted fabric (or form of a knitted fabric) may be either weft-knitted fabric knitted fabric formed by weft-knitting) or wrap-knitted fabric (or knitted fabric formed by warp-knitting). The preferred knitted fabric is the weft-knitted fabric (or knitted fabric formed by weft-knitting).

In addition, the knitted fabric may be a single-layer knitted fabric which is knitted into a single layer, or a multilayer knitted fabric which is knitted into multiple layers.

Among weft-knitted fabrics (or knitted textures of weft-knitted fabric), examples of single-layer weft-knitted fabrics include plain knitting (jersey stitch), rib stich, tuck stitch, pearl stitch, and moss stitch (front or back). Examples of multilayer weft-knitted fabrics include smooth knitting, interlock knitting, double rib knitting, single pique knitting, punch Rome knitting, Milan rib knitting, double jersey knitting, and moss stitch (double-sided). On the other hand, among warp-knitted fabrics (or knitted textures of warp-knitted fabric), examples of single-layer warp-knitted fabrics include single denbigh stitch and single cord stitch, and examples of multilayer warp-knitted fabrics include half tricot stitch, double denbigh stitch, double atlas stitch, double cord stitch, and double tricot stitch. The fiber member may be formed of only one of those knitted fabrics or a combination of two or more kinds of them.

Among those knitted fabrics using the knitting textures, the single-layer weft-knitted fabrics (such as the weft-knitted fabric using the plain knitting (jersey stitch) as knitting texture) or the multilayer knitted fabrics (such as the moss stitch fabric weft-knitted fabric using the moss stitch as the knitting texture)) are preferred. The multilayer knitted fabrics are particularly preferred in terms of resistance to sound generation with water. When the fiber member is formed of a multilayer knitted fabric, the fiber member can be formed as a bulky layer on the frictional power-transmission surface so that a rubber composition forming a compression layer can be inhibited from seeping out to the surface side (surface side of the frictional power-transmission surface) of the fiber member. Incidentally, examples of means for forming the fiber member as a bulky layer on the frictional power-transmission surface include a method for increasing the number of layers in a knitted fabric and a method for increasing the volume of a bulk textured yarn. The number of layers in the multilayer knitted fabric may be, for example, 2 to 5 layers, preferably 2 to 3 layers, and more preferably 2 layers.

Particularly when the knitted fabric (particularly the multilayer knitted fabric or the knitting texture of multiple layers) is formed by the bulk textured yarn combined at a suitable ratio to the cellulose-based fiber, rubber can be effectively prevented from seeping out to the frictional power-transmission surface (or the surface of the fiber member). Further, when the multilayer knitted fabric contains more cellulose-based fiber in a layer on the frictional power-transmission surface (or the surface of the fiber member) side in the thickness direction than in a layer on the opposite side to the frictional power-transmission surface, the water absorbability in the frictional power-transmission surface can be more improved. The multilayer knitted fabric which contains more cellulose-based fiber in the layer on the frictional power-transmission surface (or the surface of the fiber member) side may be, for example, prepared in such a manner that, of the plurality of layers, the layer on the frictional power-transmission surface (or the surface of the fiber member) side is knitted with only the cellulose-based fiber or with a yarn containing the cellulose-based fiber and the synthetic fiber, and the layer on the opposite side to the frictional power-transmission surface is knitted with a yarn (such as a polyester-based composite yarn) containing the synthetic fiber. Incidentally, in the multilayer knitted fabric, the content of the cellulose-based fiber may be increased continuously or stepwise toward the layer on the frictional power-transmission surface (or the surface of the fiber member) side.

The fiber or yarn density in the fiber member (such as the knitted fabric) may be, for example, 30 per inch or higher (for example, 32 to 70 per inch, preferably 34 to 60 per inch, and more preferably 35 to 55 per inch) in each of a wale direction and a course direction. The density may be 60 per inch or higher (for example, 62 to 120 per inch, preferably 70 to 115 per inch, more preferably 80 to 110 per inch, and particularly 90 to 105 per inch) in total. The fiber member (such as the knitted fabric) having the predetermined fiber or yarn density has a mesh opening (or loop) not too large, and has an excellent balance between the wear resistance and the water absorbability. Incidentally, when the total density of the fiber member is too low, there is a concern that the wear resistance is lowered and the water absorbability is also lowered.

Further, the bulkiness of the fiber member (such as a knitted fabric knitted with a composite yarn such as a bulk-textured yarn as the synthetic fiber) can be selected from a range in which rubber can be inhibited from seeping out. The bulkiness may be, for example, about 2 cm$^3$/g or higher (for example 2.2 to 4.5 cm$^3$/g), and preferably about 2.4 cm$^3$/g or higher (for example 2.5 to 4 cm/g). The upper limit of the bulkiness is not particularly limited, but may be, for example, 4 cm$^3$/g or lower (for example 2.3 to 3.8 cm$^3$/g), or 3.5 cm$^3$/g or lower (for example 2.5 to 3.3 cm$^3$/g). The bulkiness (cm$^3$/g) can be calculated by dividing the thickness (cm) of the knitted fabric by mass (g/cm$^2$) per unit area.

The weight of the fiber member may be, for example, about 50 to 500 g/m$^2$, preferably about 80 to 400 g/m$^2$, and more preferably about 100 to 350 g/m$^2$.

(Isocyanate Compound)

When the composite fiber layer contains an isocyanate compound in addition to the fiber member, the wear resistance of the composite fiber layer can be enhanced so that the resistance to sound generation with water can be sustained for a long time. For details, the isocyanate compound has an isocyanate group high in reactivity and react with a functional group (a group having an active hydrogen atom, such as a hydroxyl group or a carboxyl group) in the cellulose-based fiber forming the fiber member or a rubber component of a compression layer which will be described later, to thereby improve the mechanical properties of the fiber member itself and the adhesion to the compression layer. Thus, the wear resistance of the composite fiber layer can be improved. In the present invention, the fiber member forming the composite fiber layer is combined with the isocyanate compound. Thus, the adhesion and the mechanical properties of the composite fiber layer can be improved without using a resorcin-formalin-latex liquid (RFL liquid) or an epoxy resin used generally as a canvas treating agent.

Any isocyanate compound can be used as long as it has an isocyanate group as mentioned previously. However, polyisocyanate (particularly diisocyanate) having a plurality of isocyanate groups is preferred in order to improve the wear resistance of the composite fiber layer.

The isocyanate compound may be a general-purpose isocyanate compound (an isocyanate compound which is not protected by a blocking agent, such as polyisocyanate exemplified as polyisocyanate forming a thermally-reactive isocyanate compound which kill be described later). A thermally-reactive isocyanate compound (blocked isocyanate) is preferred because it does not impede the stretchability of the fiber member when the belt is shaped while it can be cured after vulcanization of the belt to thereby enhance the wear resistance, so that the productivity of the belt can be improved. For details, in the isocyanate compound which is a thermally-reactive one, the isocyanate group is protected by the blocking agent when the belt is shaped. Thus, the isocyanate compound is inactive and is not cured, so that the isocyanate compound does not impede elongation of the fiber member. On the other hand, the blocking agent is dissociated due to heat generated when the rubber is vulcanized. Thus, the isocyanate group is activated to react with the aforementioned functional group to be thereby cured. In this manner, when the thermally-reactive isocyanate compound is used, the wear resistance of the belt can be enhanced without lowering the productivity of the belt.

Thermally-reactive polyisocyanate used commonly can be used as the thermally-reactive isocyanate compound. In particular, examples of polyisocyanate forming the thermally-reactive polyisocyanate include aliphatic polyisocyanate [aliphatic diisocyanate such as propylene diisocyanate, trimethylene diisocyanate, tetramethylene diisocyanate, hexamethylene diisocyanate (HDI), trimethylhexamethylene diisocyanate (TMDI), or lysine diisocyanate (LDI), aliphatic triisocyanate such as 1,6,11-undecanetriisocyanate methyloctane, or 1,3,6-hexamethylene triisocyanate, etc.], alicyclic polyisocyanate [alicyclic diisocyanate such as cyclohexane-1,4-diisocyanate, isophorone diisocyanate (IPDI), hydrogenated xylylene diisocyanate, or hydrogenated bis(isocyanatophenyl)methane, alicyclic triisocyanate such as bicycloheptane triisocyanate, etc.], and aromatic polyisocyanate [aromatic diisocyanate such as phenylene diisocyanate, tolylene diisocyanate (TDI), xylylene diisocyanate (NDI), tetramethylxylylene diisocyanate (TMXDI), naphthalene diisocyanate (NDI), bis(isocyanatophenyl) methane (NMI), tolidine diisocyanate (TODI), or 1,3-bis (isocyanatophenyl)propane].

Each of those polyisocyanates may be a derivative such as a polymer (dimer, trimer, tetramer, etc.), an adduct product or a modified product (a biuret modified product, an allophanate modified product, a urea modified product, etc.), a urethane oligomer having a plurality of isocyanate groups etc.

For example, an adduct product of polyisocyanate (aliphatic polyisocyanate such as hexamethylene diisocyanate, or the like) and polyalcohol (such as trimethylolpropane or pentaerythritol), a biuret product of the aforementioned polyisocyanate, a polymer of the aforementioned polyisocyanate, etc. can be used preferably as the modified product or derivative of polyisocyanate. The polymer of polyisocyanate (such as aliphatic polyisocyanate) (for example, polyisocyanate having an isocyanurate ring, such as a trimer of hexamethylene diisocyanate) is particularly preferred in terms of coating properties such as appearance, strength, etc.

Among those polyisocyanates, aliphatic polyisocyanate or its derivative (such as HDI or trimer thereof), aromatic polyisocyanate (such as TDI or MDI), etc. can be generally used.

Examples of blocking agents (protective agents) for the thermally-reactive isocyanate compound include $C_{1-24}$ monoalcohols such as methanol, ethanol, or isopropanol, or alkylene oxide adducts obtained therefrom (for example, $C_{2-4}$ alkylene oxide adducts such as ethylene oxide); phenols such as phenol, cresol, or resorcin; oximes such as acetoxime, methyl ethyl ketoxime, or cyclohexane oxime lactams such as ε-caprolactam or valerolactam; and secondary amines such as dibutyl amine or ethyleneimine. Each of those blocking agents may be used alone or two or more kinds of them may be used in combination. Among them, the oximes, the lactams, etc. are generally used.

The proportion of the isocyanate group contained in the thermally-reactive isocyanate compound is not particularly limited. The proportion may be, for example, about 1 to 50 weight %, preferably about 3 to 40 weight %, and more preferably about 5 to 30 weight %.

The dissociation temperature of the thermally-reactive isocyanate compound (the temperature at which the blocking agent is dissociated to regenerate an active isocyanate group) may be equal to or higher than a heating temperature in a belt molding step before a vulcanizing step for rubber component (normally, equal to or higher than a temperature at which the fiber member impregnated with a liquid composition by immersion is dried in a composite fiber layer forming step which will be described late and equal to or lower than a temperature at which the rubber composition is vulcanized. When the dissociation temperature is high, the drying temperature can be increased to improve the productivity. Specifically the dissociation temperature may be about 100° C. or higher (for example, 110 to 200° C.), or may be, for example, 120° C. or higher (preferably 150° C. or higher, and more preferably 180° C. or higher). The dissociation temperature is, for example, about 120 to 250° C. (for example, 150 to 240° C.), preferably about 160 to 230° C. (for example, 170 to 220° C.), and more preferably about 175 to 210° C. (particularly 180 to 200° C.). When the dissociation temperature is too low, the drying temperature cannot be increased. Thus, there is a concern that it takes much time to perform drying, so that the productivity may be lowered.

The proportion of the isocyanate compound may be about 1 to 30 mass % in the composite fiber layer. The proportion is, for example, about 3 to 20 mass %, preferably about 5 to 18 mass % (particularly 5 to 15 mass %), and more preferably about 10 to 15 mass % (especially 11 to 13 mass %) in order to be able to compatibly achieve flexibility and wear resistance and to be able to enhance the wear resistance to thereby sustain the resistance to sound generation with water for a long time, while retaining the flexibility of the fiber member and the belt. When the proportion of the isocyanate compound is too low, there is a concern that the effect of improving the wear resistance may be lowered to lower the resistance to sound generation with water. On the contrary, when the proportion is too high, there is a concern that the flexibility of the fiber member and the belt may be lowered.

The isocyanate compound can have any existence form as long as it covers at least a part of fibers forming the fiber member. As for a distribution area of the isocyanate compound existing in the fiber member, the isocyanate compound may exist either in the surface of the fiber member or among internal fibers. Preferably the isocyanate compound exists with substantially uniform distribution (particularly, uniform distribution) all over the fiber member including among the internal fibers (a porous structure) in order to improve the wear resistance of the composite fiber layer. In the present invention, as will be described later, the isocyanate compound can be easily distributed uniformly in the fiber member by a method in which the fiber member is immersed in a liquid composition containing the isocyanate compound.

(Characteristic of Composite Fiber Layer)

The composite fiber layer may further contain an isocyanate compound curing agent (for example, polyols such as alkanediol, polyamines such as alkylene diamine or arene diamine (such as xylylene diamine)) in addition to the fiber member and the isocyanate compound. The proportion of the curing agent may be equal to or lower than 100 parts by mass with respect to 100 parts by mass of the isocyanate compound. The proportion is, for example, about 0.1 to 50 parts by mass, preferably about 0.5 to 30 parts by mass, and more preferably about 1 to 10 parts by mass.

The composite fiber layer may further contain other components. Examples of the other components include additives generally used, such as a surfactant, a dispersant, a filler, a coloring agent, a stabilizer, a surface treatment agent, or a leveling agent. The proportion of the other components may be equal to or lower than 10 parts by mass with respect to 100 parts by mass of the cellulose-based fiber. The proportion is, for example, about 0.01 to 5 parts by mass, preferably about 0.1 to 3 parts by mass, and more preferably about 0.5 to 2 parts by mass.

Among the additives generally used, any other adhesive component than the isocyanate compound (particularly resorcin-formaldehyde resin and epoxy resin) is preferably not contained because the composite fiber layer has high wear resistance owing to the isocyanate compound so that a bonding treatment used generally is not required for the fibers, as described previously. In the present description and the claims, a case where an adhesive component is contained at an amount which is too small to exert the effect as the adhesive component is regarded as synonymous with a case where the adhesive component is not contained.

The average thickness of the composite fiber layer may be 0.1 mm or more (for example, about 0.1 to 5 mm). The average thickness is, for example, about 0.2 to 3 mm, preferably about 0.3 to 2 mm (for example, 0.5 to 1.5 mm), and more preferably about 0.7 to 1 mm (particularly 0.8 to 0.9 mm). When the composite fiber layer is too thin, there is a concern that the resistance to sound generation with water may be lowered.

[Compression Layer]

The compression layer can be normally formed of rubber (or a rubber composition). Examples of the rubber (rubber forming the rubber composition) include known rubber components and/or elastomers, such as diene-based rubbers (e.g., natural rubber, isoprene rubber, butadiene rubber, chloroprene rubber, styrene-butadiene rubber (SBR), acrylonitrile-butadiene rubber (nitrile rubber), or hydrogenated nitrile rubber (including a mixed polymer of hydrogenated nitrile rubber and a metal salt of unsaturated carboxylic acid)), ethylene-α-olefin elastomer, chlorosulfonated polyethylene rubber, alkylated chlorosulfonated polyethylene rubber, epichlorohydrin rubber, acrylic rubber, silicone rubber, urethane rubber, and fluororubber. Each of those components may be used alone, or two or more of them may be used in combination. Among those rubber components, ethylene-α-olefin elastomer (ethylene-α-olefin-based rubber such as ethylene-propylene copolymer (EPM), or ethylene-propylene-diene terpolymer (e.g. EPDM)) is preferred because it does not contain harmful halogens, has resistance to ozone, resistance to heat and resistance to cold, and is excellent in economy.

The proportion of the rubber with respect to the whole of the compression layer (or the whole amount of the rubber composition) may be, for example, 20 mass % or higher (for example, 25 to 80 mass %), preferably 30 mass % or higher (for example, 35 to 75 mass %), and more preferably 40 mass % or higher (for example, 45 to 70 mass %).

As necessary, the compression layer (or the rubber or the rubber composition forming the compression rubber layer) may contain various additives. Examples of the additives (compounding agents) include known additives such as a vulcanizing agent or crosslinking agent [such as oximes (e.g., quinonedioxime), guanidines (e.g., diphenylguanidine), or organic peroxide (e.g., diacylperoxide, peroxyester, or dialkylperoxide), a vulcanization aid, a vulcanization accelerator, a vulcanization retarder, a reinforcing agent (e.g., carbon black or silicon oxide such as hydrated silica), a metal oxide (e.g., zinc oxide, magnesium oxide, calcium oxide, barium oxide, iron oxide, copper oxide, titanium oxide, or aluminum oxide), a filler (e.g., clay, calcium carbonate, talc, or mica), a plasticizer, a softener (e.g., oils such as paraffin oil, or naphthene-based oil), a processing agent or processing aid (e.g., stearic acid, metal stearate, wax, or paraffin), an anti-aging agent (e.g., an aromatic amine-based anti-aging agent, or a benzimidazole-based anti-aging agent), an adhesion improver (e.g., resorcin-formaldehyde condensate, melamine resin such as hexamethoxymethylmelamine, or condensate thereof (such as resorcin-melamine-formaldehyde condensate)], a colorant, a tackifier, a coupling agent silane coupling agent), a stabilizer (e.g., antioxidant, ultraviolet absorber, or thermostabilizer), a lubricant, a flame retardant, or an antistatic agent. Each of those additives may be used alone or some of them may be used in combination. Those additives can be selected in accordance with the kind, application, performance, etc. of the rubber The proportion of each of the additives can be selected suitably according to the kind of the rubber or the like. For example, with respect to 100 parts by mass of the rubber, the proportion of the reinforcing agent (e.g., carbon black) may be 10 parts by mass or higher (for example, 20 to 150 parts by mass), preferably 20 parts by mass or higher (for example, 25 to 120 parts by mass), more preferably 30 parts by mass or higher (for example, 35 to 100 parts by mass), and particularly 40 parts by mass or higher example, 50 to 80 parts by mass).

The compression layer (or the rubber composition) may contain a staple fiber. Examples of the staple fiber include a staple fiber of fiber exemplified above as fiber forming the fiber member [e.g., a cellulose-based staple fiber such as cotton or rayon, a polyester-based staple fiber (e.g. PET staple fiber), or a polyamide staple fiber (e.g., an aliphatic polyamide staple fiber such as a polyamide-6, or an aramid staple fiber)]. Each of those staple fibers may be used alone, or two or more kinds of them may be combined.

The average fiber length of the staple fiber may be, for example, about 0.1 to 30 mm (for example, 0.2 to 20 mm), preferably about 0.3 to 15 mm, and more preferably about 0.5 to 5 mm.

As necessary, those staple fibers may be subjected to a surface treatment with a surfactant, a silane coupling agent, an epoxy compound, an isocyanate compound, etc.

The staple fiber may be subjected to a bonding treatment in order to improve adhesion to the rubber component, if necessary. As the bonding treatment, a bonding treatment used commonly can be used. Examples of the bonding treatment include an immersion treatment into a resin-based treatment liquid having an adhesive component [e.g., an epoxy compound or an isocyanate compound] dissolved in an organic solvent (e.g., toluene, xylene, or methyl ethyl ketone], an immersion treatment into a resorcin-formalin-latex liquid (RFL liquid), and an immersion treatment into mucilage having a rubber composition dissolved in an organic solvent.

The proportion of the staple fiber may be, for example, about 0.5 to 50 parts by mass (for example, 1 to 40 parts by mass), and preferably about 3 to 30 parts by mass (for example, 5 to 25 parts by pass) with respect to 100 parts by mass of the rubber.

The thickness of the compression layer (the compression rubber layer or the like) can be selected suitably in accordance with the kind of the belt or the like. The thickness may be, for example, about 1 to 30 mm, preferably about 1.5 to 25 mm, and more preferably about 2 to 20 mm.

[Core Body]

The core body is not particularly limited. Normally, core wires (twisted cords) arrayed at predetermined intervals in the width direction of the belt can be used. Each core wire is not particularly limited. For example, the core wire may include a synthetic fiber such as a polyester fiber (a polyalkylene arylate-based fiber) or a polyamide fiber (such as aramid fiber), an inorganic fiber such as a carbon fiber, etc.

A twisted cord (such as an organzine one, a single-twisted one or a Lang's ay one) using a multifilament yarn can usually be used as each core wire. The average wire diameter of the core wire (the fiber diameter of the twisted cord) may be, for example, about 0.5 to 3 min, preferably about 0.6 to 2 mm, and more preferably about 0.7 to 1.5 mm. The core wires may be buried in the longitudinal direction of the belt, or may be buried side by side at predetermined pitches in parallel with the longitudinal direction of the belt.

In order to improve the adhesion to the rubber, various bonding treatments with an epoxy compound, an isocyanate compound, etc. may be performed on the core wires in the same manner as the aforementioned staple fiber.

[Tension Layer]

The tension layer may be formed of a rubber composition similar to that of the compression layer, or may be formed of a fabric (reinforcing fabric) such as canvas. Examples of the fabric (reinforcing fabric) include fabric materials such as woven fabric, wide-angle canvas, knitted fabric, and nonwoven fabric. Among these fabric materials, woven fabric that is woven in the form of a plain weave, a twill weave, or a satin weave, wide angle canvas in which the crossing angle of the warp and weft is approximately in a range of 90° to 120°, and a knitted fabric are preferred. As the fiber that constitutes the reinforcing fabric, the fibers (water absorbable fiber, non-water absorbable fiber, etc.) exemplified in the aforementioned paragraphs regarding the fiber member can be used.

In addition, a bonding treatment may be performed on the reinforcing fabric. For example, the bonding treatments exemplified in the aforementioned paragraphs regarding the staple fiber may be performed. Further, a friction treatment in which the reinforcing fabric and a rubber composition are passed through a calender roll to thereby rub the rubber composition into the reinforcing fabric, a spreading treatment of applying mucilage to the reinforcing fabric, a coating treatment of laminating a rubber composition on the reinforcing fabric, or the like may be performed in place of the bonding treatment used commonly or after the bonding treatment used commonly is performed.

In addition, the tension layer may be formed of rubber (a rubber composition). A staple fiber similar to that in the compression layer may be contained in the rubber composition in order to suppress abnormal sound generated by adhesion of the rubber in the back surface during back surface-driving. The staple fiber may be oriented at random in the rubber composition. The staple fiber may be a staple fiber partially bent.

Further, a concave and convex pattern may be provided in the surface of the tension layer (the back surface of the belt) in order to suppress abnormal sound during the back surface-driving. Examples of the concave and convex pattern include a knitted fabric pattern, a woven fabric pattern, a cord fabric pattern, and an emboss pattern. Among those patterns, the woven fabric pattern and the emboss pattern are preferred. Further, at least a part of the back surface of the tension layer may be covered with a fiber-resin mixed layer.

The thickness of the tension layer can be selected suitably in accordance with the kind of the belt or the like. The thickness may be, for example, about 0.5 to 10 mm, preferably about 0.7 to 8 mm, and more preferably about 1 to 5 mm.

[Adhesion Layer]

As described above, the adhesion layer is not always required. The adhesion layer (adhesion rubber layer) can be, for example, constituted by a rubber composition (a rubber composition containing a rubber component such as ethylene-α-olefin elastomer) similar to that of the compression layer (compression rubber layer). The rubber composition of the adhesion layer may further contain an adhesiveness improver (resorcin-formaldehyde condensate, amino resin, or the like).

The thickness of the adhesion layer can be selected suitably in accordance with the kind of the belt or the like. The thickness may be, for example, about 0.2 to 5 mm, preferably about 0.3 to 3 min, and more preferably about 0.5 to 2 mm.

Incidentally, in the rubber compositions of the tension layer and the adhesion layer, rubber belonging to the same family or the same kind as the rubber component in the rubber composition of the compression rubber layer is often used as a rubber component. In addition, in those rubber compositions, the proportions of additives such as the vulcanizing or crosslinking agent, the co-crosslinking agent or crosslinking aid, or the vulcanization accelerator can be respectively selected from ranges similar to those in the rubber composition of the compression layer.

[Method for Manufacturing Frictional Power-Transmission Belt]

The method for manufacturing the frictional power-transmission belt of the present invention includes a composite fiber layer forming step of forming a sheet for a composite fiber layer containing a fiber member and an isocyanate compound.

Composite Fiber Layer Forming Step

In the composite fiber layer forming step, the method for forming a sheet for the composite fiber layer containing the fiber member and the isocyanate compound is not particularly limited. However, in order to easily distribute the isocyanate compound uniformly into the fiber member, a method using a liquid composition containing the isocyanate compound is preferable. For example, the method may be a method of applying or spraying the liquid composition to the fiber member, or a method (immersion treatment) of immersing the fiber member into the liquid composition. In those methods, the liquid composition can permeate the inside of the fiber member so that the isocyanate compound can be distributed substantially uniformly in the surface and inside of the fiber member. Thus, the surfaces of fibers all over the fiber member can be coated substantially uniformly with the isocyanate compound. Among those methods, the method in which the isocyanate compound is impregnated in the fiber member to integrate the both by the immersion treatment is preferred because the isocyanate compound can easily permeate the inside of the fiber member and the workability is also excellent. A phrase of "to integrate the fiber member and the isocyanate compound" in the present description and the claims means a state in which the isocyanate compound is distributed among the fibers of the fiber member.

The liquid composition containing the isocyanate compound may contain a solvent. The solvent may be a hydrophobic organic solvent. However, an aqueous solvent (water, lower alcohol such as ethanol or isopropanol, ketone such as acetone, etc.) is preferable because of a small burden on environment. Particularly water is preferred.

The proportion (solid content concentration) of the isocyanate compound in the liquid composition is, for example, about 1 to 8 mass %, preferably about 1 to 6 mass %, and more preferably about 2 to 5 mass % (particularly 4 to 5 mass %) in order to enhance the wear resistance to be thereby able to sustain the resistance to sound generation with water for a long time while retaining the workability and the flexibility of the fiber member and the belt. When the proportion of the isocyanate compound is too low, there is a concern that the effect of improving the wear resistance may be lowered. On the contrary, when the proportion is too high, there is a concern that the workability may be lowered due to increase in viscosity of the aqueous solution, and the flexibility of the fiber member and the belt may be also lowered.

The present invention is also excellent in handling the liquid composition owing to the isocyanate compound. That is, when an RFT liquid which is a commonly-used treatment agent is used, maturation for a long time is required for preparation of the liquid and thereby the productivity is lowered. However, the liquid composition containing the isocyanate (particularly an aqueous solution containing isocyanate) can be used only by diluting it. Thus, the productivity can be improved. Furthermore, among isocyanate compounds, an isocyanate compound used commonly gradually cures to lower the handleability even under a state where the isocyanate compound exists as an immersion liquid. However, when a thermally-reactive isocyanate compound is used, the isocyanate compound has a long life as an immersion liquid, and can be handled easily to improve the productivity.

When the liquid composition contains a solvent, the fiber member subjected to a treatment such as immersion with the liquid composition is dried to remove the solvent. The drying may be natural drying, but it is preferable that the fiber member is heated and dried, in terms of productivity. When the liquid composition permeating the fiber member is dried, the isocyanate compound can adhere to the surfaces of fibers all over the fiber member from its inside to its surface. When a thermally-reactive isocyanate compound is used as the isocyanate compound, the liquid composition is dried at a temperature lower than the dissociation temperature of the thermally-reactive isocyanate compound, in terms of that it can be inhibited that the isocyanate compound is activated and cured due to heating in the drying treatment and thereby the flexibility of the fiber member lowers, and thus a defect in the shape of the belt caused by insufficient elongation of the fiber member can be inhibited. When the dissociation temperature is T, the drying temperature may be equal to or lower than T–10° C., for example, about T–120° C. to T–20° C., preferably about T–100° C. to T–30° C., and more preferable about T–90° C. to T–50° C. Specifically the drying temperature may be lower than 120° C., for example, about 60 to 115° C., preferably 80 to 110° C., and more preferably about 90 to 105° C.

The drying time is not particularly limited. In the present invention, a thermally-reactive isocyanate compound having a high dissociation temperature is used as the isocyanate compound, so that the liquid composition can be dried at a comparatively high temperature. Thus, the drying time can be reduced and thereby the productivity of the belt can be improved. The drying time may be 30 minutes or less (particularly 10 minutes or less). The drying time is, for example, about 0.5 to 10 minutes, preferably about 1 to 8 minutes, and further preferably about 3 to 7 minutes.

(Covering Step)

The frictional power-transmission belt of the present invention can use a method for manufacturing a commonly-used frictional power-transmission belt except for the aforementioned composite fiber layer forming step, and can be manufactured through a covering step in which a frictional power-transmission surface (compression rubber layer) is covered with a composite fiber layer. In the covering step, for example, a sheet for the composite fiber layer, a sheet for the compression layer formed of rubber (or rubber composition), a core body, and a sheet for the tension layer are laminated. A laminate obtained thus is shaped into a cylindrical shape by a shaping mold, and vulcanized to form a sleeve. The vulcanized sleeve is cut into a predetermined width. Thus, a belt in which a frictional power-transmission surface (compression rubber layer) is covered with a composite fiber layer can be prepared.

More in detail, a V-ribbed belt can be, for example, manufactured in the following method.

(First Manufacturing Method)

First, a cylindrical inner mold in which a flexible jacket has been mounted on an outer circumferential surface is used. An unvulcanized sheet for a tension layer is wound around the flexible jacket in the outer circumferential surface. A core wire (twisted cord) constituting a core body is wound thereon and spun spirally. Further, an unvulcanized sheet for a compression layer and a sheet for a composite fiber layer are wound thereon, thereby preparing a laminate. Next, a cylindrical outer mold having a plurality of rib molds cut in an inner circumferential surface thereof is used as an outer mold which can be attached to the aforementioned inner mold. The inner mold on which the laminate has been wound is placed concentrically inside the outer mold. After that, the flexible jacket is inflated toward the inner circumferential surface (rib molds) of the outer mold so as to press the laminate (compression layer) into the rib molds, and the laminate is vulcanized. Then the inner mold is taken out from the outer mold, and a vulcanized rubber sleeve having a plurality of ribs is released from the outer mold. Thus, a V-ribbed belt like a sleeve can be prepared. As necessary, in the V-ribbed belt like a sleeve, the vulcanized rubber sleeve may be cut into a predetermined width in the longitudinal direction of the belt by use of a cutter, thereby preparing a V-ribbed belt. In this first manufacturing method, the laminate including the tension layer, the core body, the compression layer, and the composite fiber layer are inflated at one time to be thereby finished into a sleeve (or a V-ribbed belt) having a plurality of ribs.

(Second Manufacturing Method)

In relation to the first manufacturing method, for example, a method disclosed in JP-A-2004-82702 (a method in which only a composite fiber layer and a compression layer are inflated to form a preliminary-molded body (in a semi-vulcanized state), and next a tension layer and a core body are inflated and crimped to the preliminary-molded body so as to be vulcanized and integrated, thereby being finished into a V-ribbed belt) may be used.

EXAMPLES

The present invention will be described in detail below with reference to examples. However, the present invention is not limited by these examples. A method for preparing a rubber composition, a method for manufacturing a belt, a method for measuring or evaluating each physical property, etc. will be shown below

[Rubber Composition]

A rubber composition shown in Table 1 was rubber-kneaded by a Banbury mixer. The kneaded rubber was passed through a calender roll to prepare an unvulcanized rolled rubber sheet (sheet for a compression layer) with a predetermined thickness. In addition, a rubber composition shown in Table 1 was used to prepare a sheet for a tension layer in the same manner as the sheet for the compression layer. Components in Table 1 are as shown below.

EPDM: "NORDEL IP4640" made by The Dow Chemical Company

Zinc oxide: "THIRD GRADE ZINC OXIDES" made by Seido Chemical Industry Co., Ltd.

Stearic acid: "STEARIC ACID CAMELLIA" made by NOF Corporation

Carbon black: "SEAST V" made by Tokai Carbon Co., Ltd., average particle size 55 nm Softener: paraffin-based oil "NS-90" made by Idemitsu. Kosan Co., Ltd.

Anti-aging agent: "NOCRAC MB" made by Ouchi Shinko Chemical Industrial Co., Ltd.

Organic peroxide: "PERCUMYL D-40" made by NOF Corporation

Co-crosslinking agent: "VULNOC PM" made by Ouchi Shinko Chemical Industrial Co., Ltd.

TABLE 1

| components of rubber composition (parts by mass) | |
|---|---|
| EPDM | 100 |
| zinc oxide | 5 |
| stearic acid | 1 |
| carbon black | 60 |
| softener | 5 |
| anti-aging agent | 2 |
| organic peroxide | 2 |
| co-crosslinking agent | 7 |
| total | 177 |

Example 1

[Preparation of Knitted Fabric Impregnated with Thermally-Reactive Isocyanate]

A cotton spun yarn (count 40, one yarn) as a cellulose-based fiber and a PTT/PET conjugate composite yarn. (fineness 84 dtex) as a synthetic fiber were knitted at a mass ratio of cellulose-based fiber/synthetic fiber=80/20, to prepare a knitted fabric (fiber member) having a knitted texture of weft-knitted fabric (moss stich, two-layer). The knitted fabric obtained thus had a thickness of 0.85 mm and a knitted fabric density (wale+course) of 100 yarns per inch.

The average thickness of the knitted fabric and the density of the knitted fabric were measured as follows. As for the average thickness of the knitted fabric, according to JIS L 1096 (2010), the knitted fabric from which unnatural wrinkles and tension were removed was placed on a flat table, and the thickness was measured at five places by a constant load type thickness meter. An average value was calculated as an average thickness. As for the density of the knitted fabric, according to JIS L 1096 (2010), the knitted fabric from which unnatural wrinkles and tension were removed was placed on a flat table, and the number of loops in a length of one inch was measured at arbitrary five places. An average value was calculated as an average density.

The obtained knitted fabric was immersed for 10 seconds in an immersion liquid in which a thermally-reactive isocyanate X ("ELASTRON BN-27" made by DKS Co. Ltd., dissociation temperature 180° C., solid content concentration 30 mass %) had been diluted with water until the solid content concentration reached 5 mass %. The knitted fabric was then dried at 100° C. for 5 minutes. Thus, a knitted fabric (sheet for a composite fiber layer) impregnated with the thermally-reactive isocyanate was prepared.

[Preparation of V-Ribbed Belt]

A cylindrical inner mold in which a flexible jacket had been attached to an outer circumferential surface was used. An unvulcanized sheet for a tension layer was wound around the flexible jacket in the outer circumferential surface. A core wire (twisted cord) serving as a core body was wound thereon and spun spirally. Further, an unvulcanized sheet for a compression layer and a sheet (the knitted fabric impregnated with the thermally-reactive isocyanate) for a composite fiber layer were wound thereon, thereby preparing a laminate. Incidentally, an aramid cord having a configuration of 1100 dtex/1×4 was used as the core wire. In order to improve the adhesion to rubber, the core wire was beforehand subjected to an immersion treatment with a resorcin-formalin-latex liquid (RFL liquid), and then subjected to a coating treatment with a treatment liquid in which a rubber composition containing EPDM had been dissolved in an organic solvent (toluene).

The inner mold on which the cylindrical laminate had been wound was placed concentrically inside a cylindrical outer mold having a plurality of rib molds cut in an inner circumferential surface thereof. The flexible jacket was inflated to press the laminate into the rib molds. The laminate was vulcanized at 180° C. for 30 minutes. Then the inner mold was taken out from the outer mold, and a vulcanized rubber sleeve having a plurality of ribs was released from the outer mold. The vulcanized rubber sleeve was cut into a predetermined width in the longitudinal direction of the belt by use of a cutter, to prepare a V-ribbed belt (number of ribs: 6, circumferential length: 980 nm, belt shape: K-shape, belt thickness: 4.3 mm, rib height: 2 mm, rib pitch: 3.56 mm).

[Durability Test Conditions 1]

Figure 2:
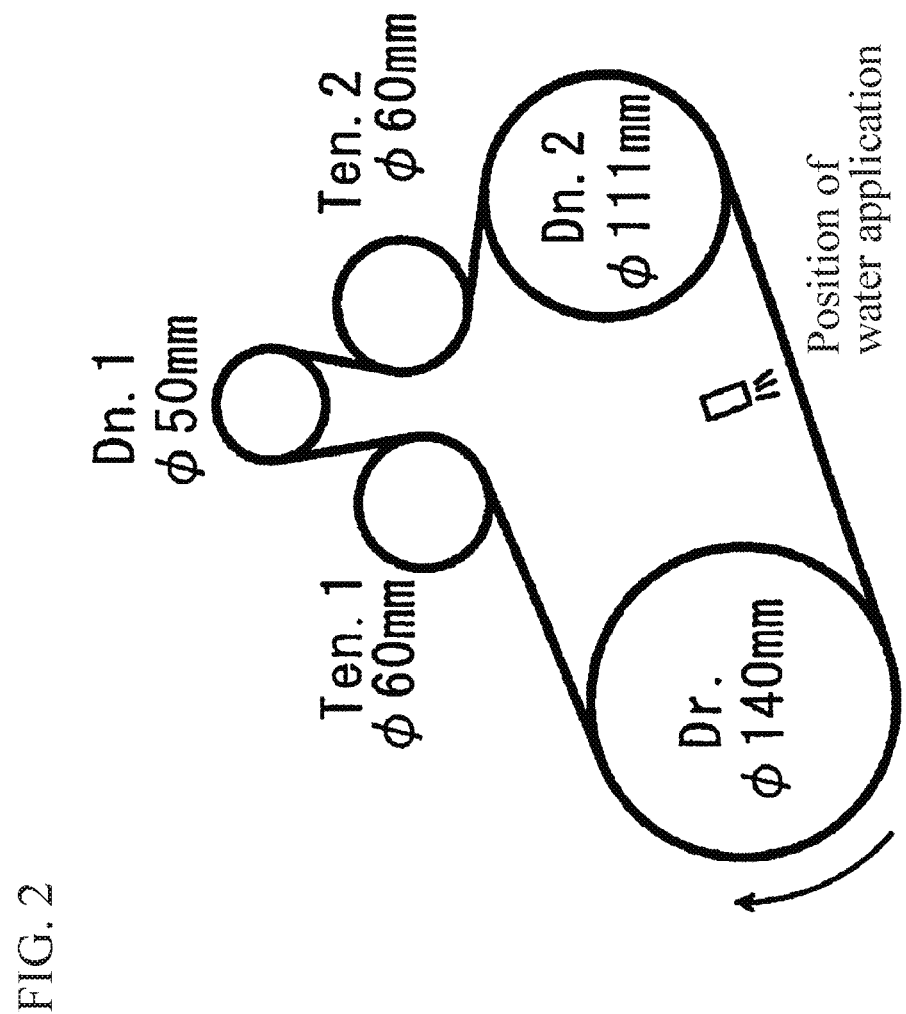
FIG. 2 is a schematic view showing a layout of a testing machine used for a durability test on Examples under Durability Test Conditions 1.

A belt was driven by use of a testing machine having a layout shown in FIG. 2 in which a driving pulley (Dr.) having a diameter of 140 mm, a first tension pulley (Ten, 1) having a diameter of 60 mm, a first driven pulley (Dn. 1) having a diameter of 50 mm, a second tension pulley (Ten. 2) having a diameter of 60 mm, and a second driven pulley (Dn. 2) having a diameter of 111 mm were disposed in that order. Thus, a durability test was performed. The V-ribbed belt obtained thus was laid on the pulleys of the testing machine. The rotation speed of the driving pulley was varied within a range of 800±160 rpm. A load of 16 N·m was applied to the first driven pulley, and no load was applied to the second driven pulley. The belt tension was set at 200 N/6 ribs. Water was applied from the compression layer side of the belt at a central position between the driving pulley and the second driven pulley. The application of water was performed once (for five seconds) every 60 seconds. The rate of the water application was set at 100 cc/sec (500 cc/5 sec). The test temperature was set at 25° C., and the test time was set at 60 minutes.

Comparative Example 1

A V-ribbed belt was prepared in the same manner as in Example 1, except that in the preparation of the knitted fabric impregnated with the thermally-reactive isocyanate the immersion treatment with the immersion liquid containing the thermally-reactive isocyanate and the drying treatment were not performed. The V-ribbed belt was driven on Durability Test Conditions 1.

The V-ribbed belts obtained in Example 1 and Comparative Example 1 were driven on Durability Test Conditions 1, and slip ratios during water application before and after the durability test were obtained using the following formula. Existence or absence of sound generation during the water application after the durability test and the appearance of the frictional power-transmission surface after the durability test were checked. Results are shown in Table 2.

Slip ratio (%)=[($K1-K2$)/$K1$]×100

[In this equation, $K1=N1/R1$ and $K2=N2/R2$, where R1 designates the rotation speed (rpm) of the driving pulley running with no load, N1 designates the rotation speed (rpm) of the driven pulley running with no load, R2 designates the rotation speed (rpm) of the driving pulley running with a load, and N2 designates the rotation speed (rpm) of the driven pulley running with a load]

TABLE 2

|  | Example 1 | Comparative Ex. 1 |
|---|---|---|
| slip ratio (before durability test) | 1% | 1% |
| slip ratio (after durability test) | 1% | 18% |
| resistance to sound generation | no sound generation | abnormal sound generated |
| appearance | no change | cotton falling out |

As is apparent from the results in Table 2, in Comparative Example 1 having no coating treatment with the isocyanate compound, the slip ratio before the durability test was as low as that in Example 1, but the slip ratio after the durability test was increased, and abnormal sound was generated. In addition, it was confirmed that cotton serving as the fiber member fell out of the frictional power-transmission surface. On the other hand, in Example 1 subjected to the coating treatment with the isocyanate compound, there was no increase in slip ratio or no abnormal sound generation after the durability test, and no conspicuous change in appearance was observed.

Example 2

A vulcanized rubber sleeve was produced in the same manner as in Example 1. The vulcanized rubber sleeve was cut into a predetermined width in the longitudinal direction of the belt by use of a cutter to prepare a V-ribbed belt (number of ribs: 3, circumferential length: 1500 mm, belt shape: K-shape, belt thickness: 4.3 mm, rib height: 2 mm, rib pitch: 3.56 mm).

[Durability Test Conditions 2]

Figure 3:
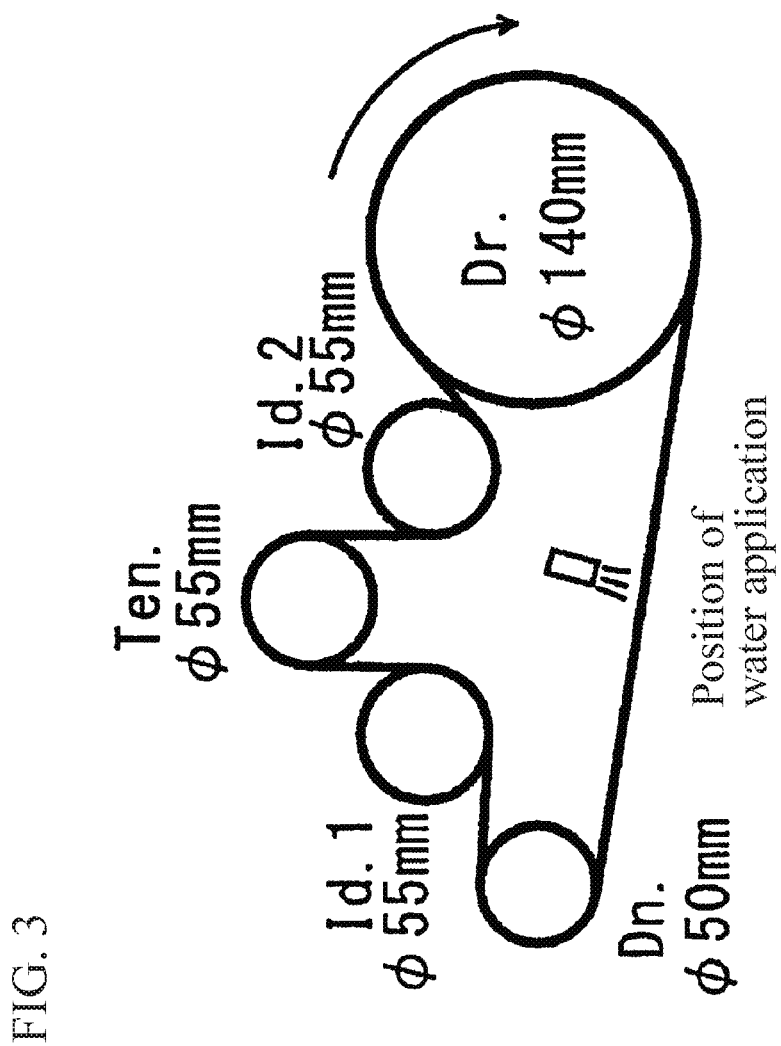
FIG. 3 is a schematic view showing a layout of a testing machine used for a durability test on Examples under Durability Test Conditions 2.

A belt was driven by use of a testing machine having a layout shown in FIG. 3 in which a driving pulley (Dr.) having a diameter of 140 mm, a driven pulley (Dn.) having a diameter of 50 mm, a first idler pulley (Id. 1) having a diameter of 55 mm, a tension pulley (Ten.) having a diameter of 55 mm, and a second idler pulley (Id. 2) having a diameter of 55 mm were disposed in that order. Thus, a durability test was performed. The V-ribbed belt (number of ribs 3, circumferential length 1500 mm) obtained thus was laid on the pulleys of the testing machine. The rotation speed of the driving pulley was set at 800 rpm. A load of 15 N·m was applied to the driven pulley, and the belt tension was set at 150 N/3 ribs. Water was applied from the compression layer side of the belt at a central position between the driving pulley and the driven pulley. The application of water was performed once (for five seconds) every 60 seconds. The rate of the water application was set at 100 cc/sec (500 cc/5 sec). The test temperature was set at 25° C., and the test time was set at 45 minutes.

Example 3

A V-ribbed belt was prepared in the same method as in Example 2, except that an immersion liquid containing thermally-reactive isocyanate X was diluted until the solid content concentration thereof reached 3 mass % in the preparation of a knitted fabric impregnated with thermally-reactive isocyanate. The V-ribbed belt was driven under Durability Test Conditions 2.

Example 4

A V-ribbed belt was prepared in the same method as in Example 2, except that an immersion liquid containing thermally-reactive isocyanate X was diluted until the solid content concentration thereof reached I mass % in the preparation of a knitted fabric impregnated with thermally-reactive isocyanate. The V-ribbed belt was driven under Durability Test Conditions 2.

Example 5

A V-ribbed belt was prepared in the same method as in Example 2, except that knitting was performed at a mass ratio between a cellulose-based fiber and a synthetic fiber of cellulose-based fiber/synthetic fiber=60/40 in the preparation of a knitted fabric impregnated with thermally-reactive isocyanate. The V-ribbed belt was driven under Durability Test Conditions 2.

Example 6

A V-ribbed belt was prepared in the same method as in Example 2, except that knitting was performed at a mass ratio between a cellulose-based fiber and a synthetic fiber of cellulose-based fiber/synthetic fiber=50/50 in the preparation of a knitted fabric impregnated with thermally-reactive isocyanate. The V-ribbed belt was driven under Durability Test Conditions 2.

Example 7

A V-ribbed belt was prepared in the same method as in Example 2, except that knitting was performed at a mass ratio between a cellulose-based fiber and a synthetic fiber of cellulose-based fiber/synthetic fiber=30/70 in the preparation of a knitted fabric impregnated with thermally-reactive isocyanate. The V-ribbed belt was driven under Durability Test Conditions 2.

Example 8

A V-ribbed belt was prepared in the same method as in Example 2, except that thermally-reactive isocyanate Y ("ELASTRON BN-77" made by DKS Co. Ltd., dissociation temperature 120° C., solid content concentration 30 mass %) was used in place of the thermally-reactive isocyanate X in the preparation of a knitted fabric impregnated with thermally-reactive isocyanate. The V-ribbed belt was driven under Durability Test Conditions 2.

Example 9

A V-ribbed belt was prepared in the same method as in Example 2, except that a knitted fabric (thickness 0.6 mm, knitted fabric density 80 yarns/inch) having a knitted texture of weft-knitted fabric (moss stitch, single-layer) was prepared in place of a knitted fabric (thickness 0.85 mm, knitted fabric density 100 yarns/inch) having a knitted texture of weft-knitted fabric (moss stitch, two-layer) in the preparation of a knitted fabric impregnated with thermally-reactive isocyanate. The V-ribbed belt was driven under Durability Test Conditions 2.

Example 10

A V-ribbed belt was prepared in the same method as in Example 2, except that a PET/PU covering yarn (fineness 84 dtex) was used as the synthetic fiber in place of a PIT/PET conjugate composite yarn (fineness 84 dtex) in the preparation of a knitted fabric impregnated with thermally-reactive isocyanate. The V-ribbed belt was driven under Durability Test Conditions 2.

The V-ribbed belts obtained in Examples 2 to 10 were driven under Durability Test Conditions 2. Existence or absence of sound generation during water application after the durability test and the appearance of the frictional power-transmission surface after the durability test were checked and evaluated according to the following criteria. Slip ratios after the durability test were obtained using the aforementioned formula. Results are shown in Table 3

(Criteria of Appearance)
A: no visually observable fray
B: very small fray generated
C: large fray generated Incidentally, attachment ratio in Table 3 can be calculated using the following expression.

Attachment ratio (%)=1[(mass of fiber member after coating treatment−mass of fiber member before coating treatment)/(mass of fiber member after coating treatment)]×100

TABLE 3

| | Examples | | | | | | | | |
|---|---|---|---|---|---|---|---|---|---|
| | 2 | 3 | 4 | 5 | 6 | 7 | 8 | 9 | 10 |
| knitted texture | moss stitch two layers | moss stitch two layers | moss stitch two layers | moss stitch two layers | moss stitch two layers | moss stitch two layers | moss stitch two layers | moss stitch single layer | moss stitch two layers |
| cellnose-based fiber/synthetic fiber | 80/20 | 80/20 | 80/20 | 60/40 | 50/50 | 30/70 | 80/20 | 80/20 | 80/20 |
| Synthetic fiber | PTT/PET | PTT/PET | PTT/PET | PTT/PET | PTT/PET | PTT/PET | PTT/PET | PTT/PET | PET/PU |
| thermally-reactive | X | X | X | X | X | X | Y | X | X |

TABLE 3-continued

| | Examples | | | | | | | | |
|---|---|---|---|---|---|---|---|---|---|
| | 2 | 3 | 4 | 5 | 6 | 7 | 8 | 9 | 10 |
| isocyanate solid content concentration of immersion liquid | 5% | 3% | 1% | 5% | 5% | 5% | 5% | 5% | 5% |
| attachment ratio | 12% | 6% | 3% | 12% | 12% | 12% | 12% | 12% | 12% |
| resistance to sound generation (time until abnormal sound generated) | no sound generation | no sound generation | 40 minutes | no sound generation | no sound generation | 30 minutes | no sound generation | 40 minutes | no sound generation |
| appearance | A | B | C | A | A | B | A | B | A |
| slip ratio (after durability test) | 1% | 2% | 6% | 1% | 2% | 8% | 1% | 4% | 1% |

As is apparent from the results in Table 3, for Examples 2 to 4, as the solid content concentration of the immersion liquid and the attachment ratio of the isocyanate compound to the fiber member were higher, the occurrence of fray in the fiber member was suppressed, the wear resistance and the resistance to sound generation were improved, and the slip ratio also tended to be lowered.

From the results in Example 2 and Examples 5 to 7, as the ratio of the cellulose-based fiber was higher, the resistance to sound generation was improved and the slip ratio also tended to be lowered.

In comparison between the results in Example 2 and the results in Example 8, equivalent results were obtained for the thermally-reactive isocyanate having the dissociation temperature of 120° C. or 180° C.

In comparison between the results in Example 2 and the results in Example 9, the two-layer knitted fabric was more excellent in resistance to sound generation and the slip ratio than the single-layer knitted fabric.

In comparison between the results in Example 2 and the results in Example 10, equivalent results were obtained for the kind of the synthetic fiber of the PTT/PET conjugate composite yarn or the PET/PU covering yarn.

Reference Example 1

AV-ribbed belt was prepared in the same method as in Example 1, except that the drying temperature after immersion was set at 180° C. in the preparation of a knitted fabric impregnated with thermally-reactive isocyanate. However, due to the drying temperature being too high, the extensibility of the fiber member deteriorated to generate a defect in the rib shape. In order to prevent such a problem, it is preferable that the dissociation temperature of blocked isocyanate is higher, and it is preferable that the drying temperature of the fiber member is made sufficiently lower than the dissociation temperature of the blocked isocyanate.

INDUSTRIAL APPLICABILITY

A frictional power-transmission belt of the present invention can be used as a frictional power-transmission belt such as a flat belt, a V-belt, or a V-ribbed belt. In addition, the frictional power-transmission belt of the present invention can improve calmness when the belt is wetted with water. Thus, the frictional power-transmission belt can be used suitably for a high-load power-transmission apparatus which is used outdoor, such as an automobile, a motorcycle, or an agricultural machine.

The present invention has been described in detail and with reference to a specific embodiment. However, it is obvious for those in the art that various modifications or changes can be made without departing from the spirit and scope of the present invention.

The present application is based on Japanese Patent Application No. 2018-002080 filed on Jan. 10, 2018, and Japanese Patent Application No. 2018-235506 filed on Dec. 17, 2018, the contents of which are incorporated herein by reference.

REFERENCE SIGNS LIST

1 . . . frictional power-transmission belt (V-ribbed belt)
2 . . . compression layer
3 . . . core body
4 . . . tension layer
5 . . . composite fiber layer

The invention claimed is:

1. A frictional power-transmission belt having a frictional power-transmission surface covered with a composite fiber layer, wherein
   the composite fiber layer comprises a fiber member and an isocyanate compound, wherein the composite fiber layer does not contain either a resorcin-formaldehyde resin or an epoxy resin,
   the fiber member is a multilayer knitted fabric comprising a cellulose-based fiber and a synthetic fiber,
   the isocyanate compound is a thermally-reactive isocyanate compound,
   the isocyanate compound has a proportion of 5 to 20 mass % in the composite fiber layer, and
   a ratio of the cellulose-based fiber to the synthetic fiber is 80/20 to 50/50 in the fiber member.

2. The frictional power-transmission belt according to claim 1, wherein the thermally-reactive isocyanate compound has a dissociation temperature of 120° C. or higher.

3. The frictional power-transmission belt according to claim 1, wherein the cellulose-based fiber is a spun yarn formed of a cellulose.

4. The frictional power-transmission belt according to claim 1, being a V-ribbed belt.

5. The frictional power-transmission belt according to claim 1, wherein the thermally-reactive isocyanate compound has a dissociation temperature of 175° C. or higher.

6. The frictional power-transmission belt according to claim 1, wherein the thermally-reactive isocyanate compound has a dissociation temperature of 120° C. to 180° C.

7. The frictional power-transmission belt according to claim 1, wherein the isocyanate compound has a proportion of 10 to 20 mass % in the composite fiber layer.

8. A manufacturing method of the frictional power-transmission belt according to claim 1, comprising a composite fiber layer forming step of forming a sheet for the composite fiber layer comprising the fiber member and the isocyanate compound.

9. The manufacturing method according to claim 8, comprising, in the composite fiber layer forming step, a step of immersing the fiber member in a liquid composition comprising the isocyanate compound so as to impregnate the fiber member with the isocyanate compound.

10. The manufacturing method according to claim 9, wherein the liquid composition is an aqueous solution comprising a thermally-reactive isocyanate compound.

11. The manufacturing method according to claim 10, wherein, in the composite fiber layer forming step, the fiber member impregnated with the liquid composition by an immersion is dried at a temperature lower than a dissociation temperature of the thermally-reactive isocyanate compound.

12. The manufacturing method according to claim 9, wherein the isocyanate compound in the liquid composition has a proportion of 1 to 8 mass %.

* * * * *